W. L. BROWN.
LUBRICANT DISTRIBUTER FOR INTERNAL COMBUSTION ENGINES.
APPLICATION FILED JUNE 17, 1920.
1,387,587. Patented Aug. 16, 1921.
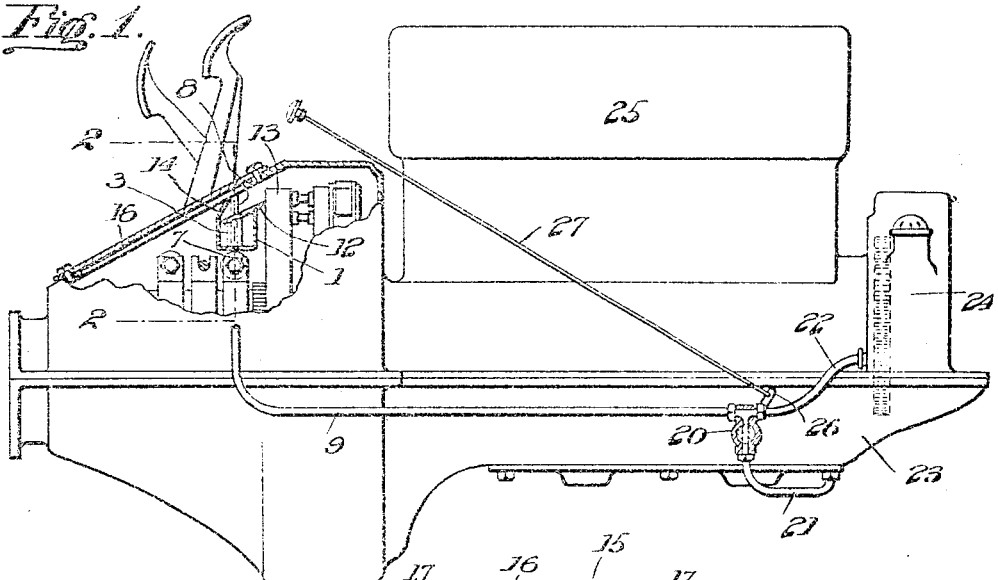
Fig. 1.
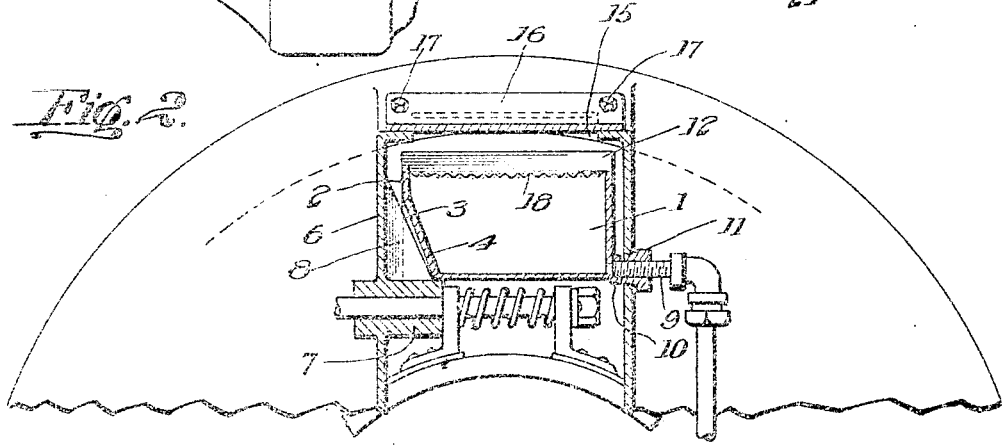
Fig. 2.
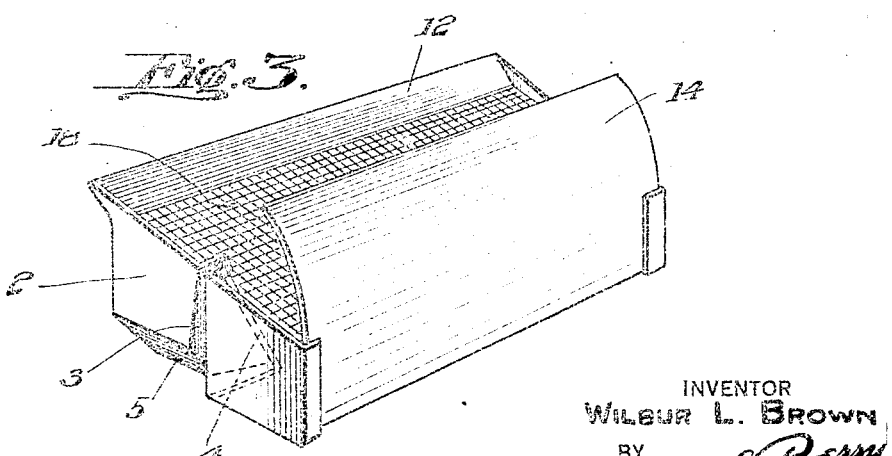
Fig. 3.
INVENTOR
WILBUR L. BROWN
BY
ATTORNEY

UNITED STATES PATENT OFFICE.

WILBUR L. BROWN, OF SANTA ANA, CALIFORNIA.

LUBRICANT-DISTRIBUTER FOR INTERNAL-COMBUSTION ENGINES.

1,387,587.  Specification of Letters Patent.  Patented Aug. 16, 1921.

Application filed June 17, 1920. Serial No. 389,744.

*To all whom it may concern:*

Be it known that I, WILBUR L. BROWN, a citizen of the United States, residing at Santa Ana, in the county of Orange and State of California, have invented new and useful Improvements in Lubricant-Distributers for Internal-Combustion Engines, of which the following is a specification.

This invention relates to an oil distributer which is especially applicable for use on internal combustion engines and adapted to be mounted within the fly wheel and transmission case of the engine of an auto vehicle and fitted with a conduit whereby lubricating oil splashed by the fly wheel may be collected and delivered by gravity to a point on the engine casing remote from the fly wheel.

The main object of this invention is to provide a lubricant collecting pan or trough which may be readily disposed in the fly wheel and transmission case of an auto vehicle engine and securely supported therein in such position as to receive oil thrown by the fly wheel and deliver the oil by gravity to a point remote from the fly wheel, such as the engine crank case and timing gear case.

Another object is to provide a lubricating distributer for auto vehicles which may be mounted in the transmission case adjacent the transmission case cover plate so that said plate may be removed without removing the distributer.

Other objects will appear hereinafter.

My invention is illustrated in the accompanying drawing forming a part of this specification, in which:

Figure 1 is a view partly in section and partly in side elevation of my lubricant distributer and an automobile engine and transmission on which my lubricant distributer is mounted.

Fig. 2 is a sectional view of Fig. 1 taken on line 2—2 of Fig 1.

Fig. 3 is a perspective view of the lubricant trough.

Part marked 1 is a lubricant trough, the end wall 2 of which is bent inwardly to form a narrow recess 3 which diverges downwardly; the inner wall 4 of said recess being inclined downwardly and inwardly. The lower wall of the trough 1 at one side of the recess 3 is inclined upwardly at 5 to the end wall 2. The trough 1 is mounted in the transmission casing 6 upon the pedal shaft bearing 7, the inclined web 8 in said casing which reinforces the bearing 7 extending into the recess 3. An outlet pipe 9 detachably fitted in an outlet 10 in the forward wall of the trough 1 at the bottom thereof; said pipe extending through the wall of the transmission casing 6, and a nut 11 screwing on said pipe and into said casing to hold the pipe properly in position with relation to the trough. The upper edge of the forward wall of the trough 1 has an upwardly inclined external lip 12 which rests adjacent the fly wheel 13 near the periphery thereof, a shield 14 extends upwardly and curves inwardly from the rear wall of the trough 1 to the upper wall of the transmission casing 6, the upper wall of the transmission casing being provided with the usual opening 15 which is closed by the usual cover plate 16 bolted by bolts 17 to the top of the casing; a screen 18 extends across the top of the trough 1. The pipe 9 leads to a valve 20, from which valve pipes 21 and 22 lead into the crank case 23 and into the timing gear casing 24 respectively of the auto vehicle engine 25. The pipe 22 entering the timing gear casing at a point below the level of the trough 1, so that the lubricant will flow by gravity from the trough 1 through the pipe 9, valve 20 and pipe 22 into the timing gear casing. An arm 26 is connected to the valve 20, and a rod 27 is connected to the arm 26 and leads through the dash of the auto vehicle where it may be grasped by the driver to operate.

When the valve is opened oil may pass from the trough 1 through the pipe 9, through the pipe 22 into the timing gear casing 24 and through the valve 20 and pipe 21 into the crank case 23. When the valve is closed the lubricant passes only from the pipe 9 through the pipe 22 into the timing gear casing 24 and does not pass through the pipe 21 into the crank case. As the trough 1 is mounted in the casing independently of the cover plate 16 said plate may be removed without removing the trough.

I claim:

In combination with an auto vehicle engine and transmission, a lubricant trough mounted in the transmission casing to receive lubricant from the engine fly wheel, an outlet pipe leading from said lubricant trough, a valve through which said outlet pipe is connected, a second pipe leading from said valve to the engine crank case, and a third pipe leading from the valve to the timing gear casing, said valve when open permitting the lubricant to pass from said outlet pipe through said second and third pipe into the crank case and the timing gear casing, and when closed shutting off the lubricant from the outer pipe through the second pipe into the crank casing by allowing the lubricant to flow from the valve into the timing gear casing.

WILBUR L. BROWN.